United States Patent
Astigarraga et al.

(10) Patent No.: US 9,660,882 B2
(45) Date of Patent: May 23, 2017

(54) SELECTIVE CONVOLUTION ENCODING OF DATA TRANSMITTED OVER DEGRADED LINKS

(71) Applicant: International Business Machines Corporation, Armonk, NY (US)

(72) Inventors: Tara Astigarraga, Fairport, NY (US); Louie A. Dickens, Tucson, AZ (US); Michael E. Starling, Bonsall, CA (US); Daniel J. Winarski, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 533 days.

(21) Appl. No.: 14/149,766

(22) Filed: Jan. 7, 2014

(65) Prior Publication Data
US 2015/0195160 A1    Jul. 9, 2015

(51) Int. Cl.
*H04L 12/26* (2006.01)
*H04L 1/20* (2006.01)
*H04L 1/08* (2006.01)
*H04L 1/00* (2006.01)

(52) U.S. Cl.
CPC .......... *H04L 43/062* (2013.01); *H04L 1/0009* (2013.01); *H04L 1/0042* (2013.01); *H04L 1/0054* (2013.01); *H04L 1/08* (2013.01); *H04L 1/20* (2013.01); *H04L 43/0847* (2013.01); *H04L 1/0059* (2013.01); *H04L 43/16* (2013.01)

(58) Field of Classification Search
None
See application file for complete search history.

(56) References Cited

U.S. PATENT DOCUMENTS

| | | | |
|---|---|---|---|
| 7,054,296 B1 * | 5/2006 | Sorrells | H04B 1/406 370/338 |
| 2001/0036232 A1 | 11/2001 | Betts | |
| 2002/0135502 A1 | 9/2002 | Lu | |

(Continued)

FOREIGN PATENT DOCUMENTS

| | | |
|---|---|---|
| EP | 0707402 | 4/1996 |
| EP | 1151546 | 11/2001 |

OTHER PUBLICATIONS

J. Hagenauer, "Rate-Compatible Punctured Convolutional Codes (RCPC codes) and Their Applications" IEEE Transactions on Communications, vol. 36(4), pp. 389-400, 1988.

*Primary Examiner* — Faruk Hamza
*Assistant Examiner* — Thinh Tran
(74) *Attorney, Agent, or Firm* — Zilka-Kotab, PC (57) ABSTRACT

In one embodiment, a system includes a processor and logic integrated with and/or executable by the processor, the logic being configured to cause the processor to determine that a link configured to transmit data between two end points in a networking system has become degraded, encode data prior to transmitting the data across the degraded link, and transmit the encoded data across the degraded link provided that data transmitted across a normal link is not encoded. In another embodiment, a method for selectively overcoming a degraded link in a networking system includes determining that a link configured to transmit data between two end points has become degraded, encoding data prior to transmitting the data across the degraded link, and transmitting the encoded data across the degraded link.

15 Claims, 10 Drawing Sheets

(56) References Cited

U.S. PATENT DOCUMENTS

| | | | |
|---|---|---|---|
| 2003/0012228 A1* | 1/2003 | Tanaka | H03M 13/00 370/529 |
| 2004/0017856 A1 | 1/2004 | Mantelet et al. | |
| 2007/0105503 A1* | 5/2007 | Kim | H04B 7/04 455/70 |
| 2008/0209304 A1* | 8/2008 | Winarski | G06F 11/1088 714/763 |
| 2009/0259907 A1 | 10/2009 | Chernyshev et al. | |
| 2009/0282320 A1* | 11/2009 | Liao | H03M 13/1525 714/784 |
| 2012/0014347 A1* | 1/2012 | Tanaka | H04L 1/0007 370/329 |
| 2013/0303171 A1* | 11/2013 | Jang | H04W 36/30 455/436 |

* cited by examiner

SELECTIVE CONVOLUTION ENCODING OF DATA TRANSMITTED OVER DEGRADED LINKS

BACKGROUND

The present invention relates to networking systems, and more particularly, this invention relates to selective convolution encoding of data packages transmitted over degraded links in a networking system.

A typical networking system includes many components that allow for network traffic to be sent to and from various end devices in communication with the networking system. The components may include switches (virtual or physical), routers (virtual or physical), servers (virtual or physical), Ethernet links, fiber optic links, fiber channel links, etc. These components may be interconnected in such a way as to provide links to the various end devices connected to the networking system.

During normal operation, end devices connected to the networking system are able to send and receive network traffic via the networking system, the network traffic comprising one or more packets of data. Typically, a path through the networking system which provides the highest effective data rate is chosen between any two end devices. The highest effective data rate is a measure as to how much data actually gets through the networking system, and is used instead of a simple burst data rate, which is rarely ever accomplished and is a poor measure of throughput. In some instances, only about 30% of the burst data rate may actually be accomplished in a networking system.

In addition, as transmission errors occur more and more frequently, the effective data rate will also be reduced due to forced retries. Errors occur much more frequently when data is transmitted over degraded links. Links may become degraded to a variety of reasons, such as age, corrosion, conflicts, etc. One conventional solution to this problem is to use error correction code (ECC) when transmitting data through a networking system. However, ECC adds overhead to the data transmissions which also reduces the effective data rate because less data is included in each packet, and over a certain period of time, this reduces the amount of data actually transmitted/received. There is currently no procedure or system which is capable of balancing the need for ECC with the goal of increasing the effective data rate through a networking system.

BRIEF SUMMARY

In one embodiment, a system includes a processor and logic integrated with and/or executable by the processor, the logic being configured to cause the processor to determine that a link configured to transmit data between two end points in a networking system has become degraded, encode data prior to transmitting the data across the degraded link, and transmit the encoded data across the degraded link provided that data transmitted across a normal link is not encoded.

In another embodiment, a computer program product for selectively overcoming a degraded link in a networking system includes a computer readable storage medium having program code embodied therewith, the program code being readable/executable by a processor to determine that a link configured to transmit data between two end points has become degraded, encode data prior to transmitting the data across the degraded link, and transmit the encoded data across the degraded link provided that data transmitted across a normal link is not encoded.

According to another embodiment, a method for selectively overcoming a degraded link in a networking system includes determining that a link configured to transmit data between two end points has become degraded, encoding data prior to transmitting the data across the degraded link, and transmitting the encoded data across the degraded link.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of tape drives and data buffer operational schemes that improve tape drive performance and reduce lag upon receiving a synchronization (sync) command.

In one embodiment, a switching algorithm may be used to selectively utilize error correction code (ECC) when transmitted data through a networking system in order to maximize an effective data rate under varying circumstances. This switching algorithm may dictate that data is transmitted normally without ECC on normal links, while relying on ECC when a minimum number of errors (and/or retries) are encountered on one or more degraded links. This allows for ECC to be skipped for normal links, which alleviates very intensive calculations from needing to be performed for every data transmission, while ensuring that data transmitted over troublesome links receives robust ECC.

In one general embodiment, a system includes a processor and logic integrated with and/or executable by the processor, the logic being configured to cause the processor to determine that a link configured to transmit data between two end points in a networking system has become degraded, encode data prior to transmitting the data across the degraded link, and transmit the encoded data across the degraded link provided that data transmitted across a normal link is not encoded.

In another general embodiment, a computer program product for selectively overcoming a degraded link in a networking system includes a computer readable storage medium having program code embodied therewith, the program code being readable/executable by a processor to determine that a link configured to transmit data between two end points has become degraded, encode data prior to transmitting the data across the degraded link, and transmit the encoded data across the degraded link provided that data transmitted across a normal link is not encoded.

According to another general embodiment, a method for selectively overcoming a degraded link in a networking system includes determining that a link configured to transmit data between two end points has become degraded, encoding data prior to transmitting the data across the degraded link, and transmitting the encoded data across the degraded link.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Moreover, a system according to various embodiments may include a processor and logic integrated with and/or executable by the processor, the logic being configured to perform one or more of the process steps recited herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
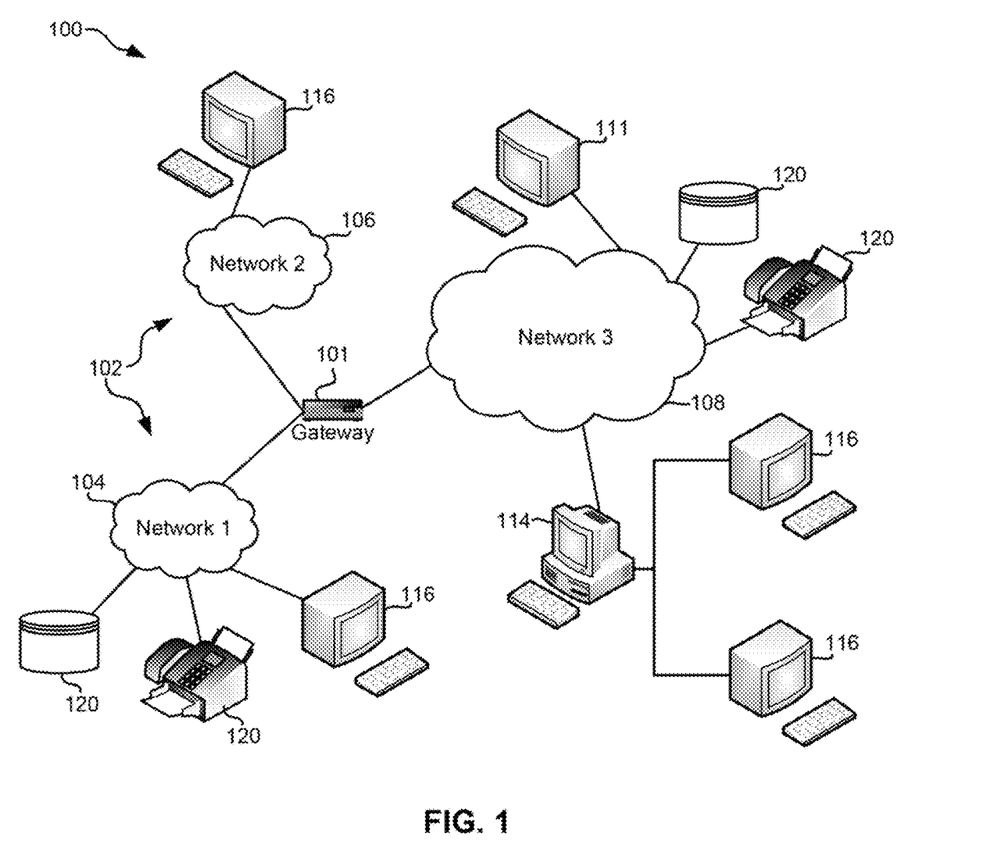
FIG. 1 illustrates a network architecture, in accordance with one embodiment.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VM WARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
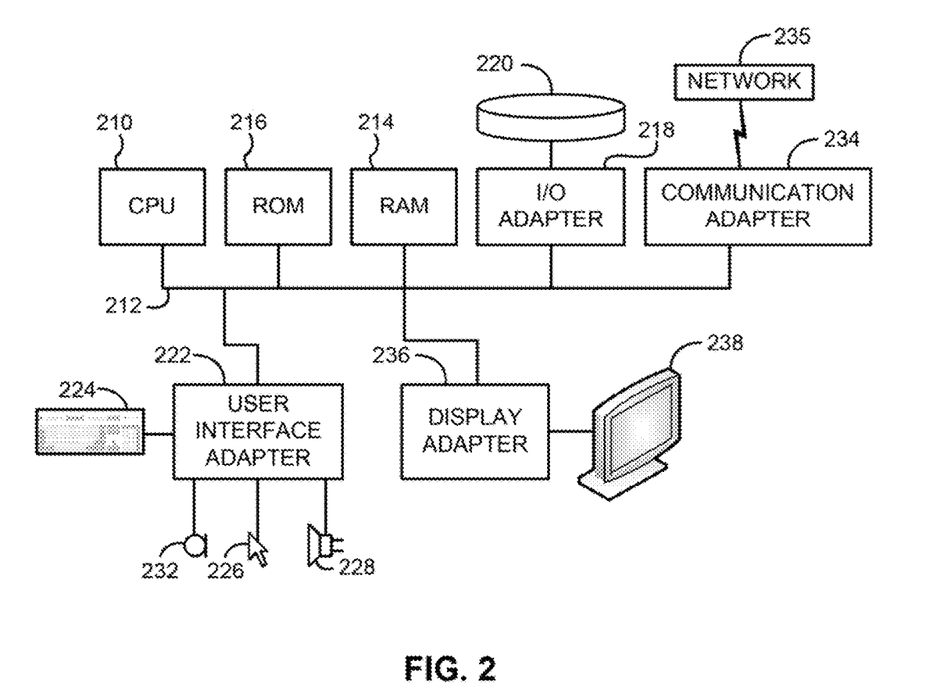
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows. Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
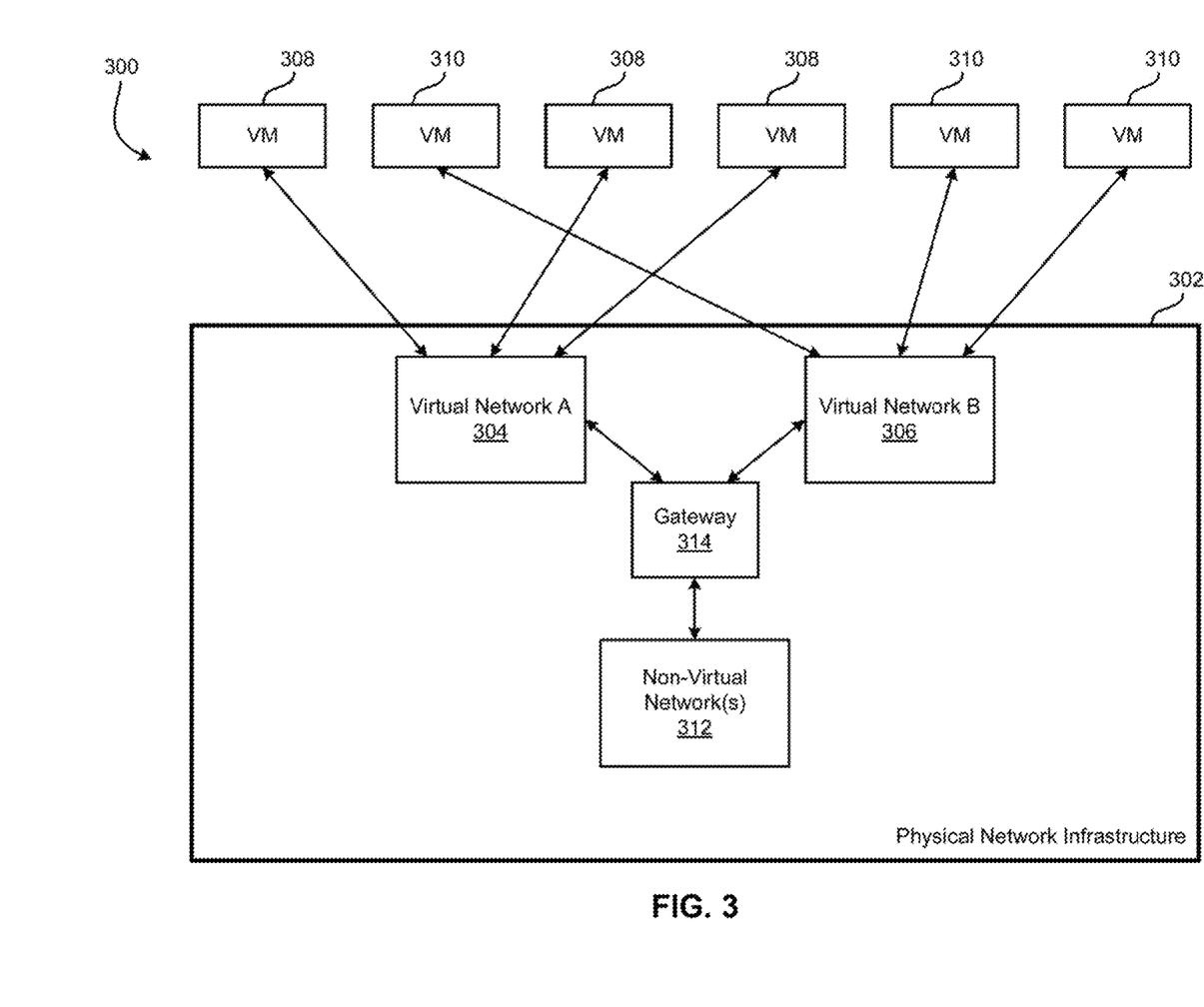
FIG. 3 is a simplified diagram of a virtualized data center, according to one embodiment.

Referring now to FIG. 3, a conceptual view of an overlay network 300 is shown according to one embodiment. The overlay network may utilize any overlay technology, standard, or protocol, such as a Virtual eXtensible Local Area Network (VXLAN), Distributed Overlay Virtual Ethernet (DOVE), Network Virtualization using Generic Routing Encapsulation (NVGRE), etc.

In order to virtualize network services, other than simply providing a fabric communication path (connectivity) between devices, services may be rendered on packets as they move through the gateway 314 which provides routing and forwarding for packets moving between the non-virtual network(s) 312 and the Virtual Network A 304 and Virtual Network B 306. The one or more virtual networks 304, 306 exist within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc., as would be known by one of skill in the art. This network infrastructure 302 supports at least one non-virtual network 312, which may be a legacy network.

Each virtual network 304, 306 may use any number of virtual machines (VMs) 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time.

According to one embodiment, the overlay network 300 may include one or more cell switched domain scalable fabric components (SFCs) interconnected with one or more distributed line cards (DLCs).

By having a "flat switch" architecture, the plurality of VMs may move data across the architecture easily and efficiently. It is very difficult for VMs, generally, to move across Layer-3 (L3) domains, between one subnet to another subnet, internet protocol (IP) subnet to IP subnet, etc. But if it the architecture is similar to a large flat switch, in a very large Layer-2 (L2) domain, then the VMs are aided in their attempt to move data across the architecture.

According to one embodiment, convolution encoding, such as partial response maximum likelihood (PRML), may be used to encode data that is transmitted over degraded links between end points in a networking system. In this embodiment, the data packets which are received at the receiving end point may be trellis decoded. Any type of degraded link may utilize this encoding/decoding scheme, such as Gigabit Ethernet (GbE) links, Fiber Channel over Ethernet (FCoE) links, Small Computer System Interface (SCSI) links, internet Small Computer System Interface (iSCSI) links, Infiniband, etc. Such convolution encoding is able to accommodate a significant loss of random bits in the transmitted data stream while still allowing the data to be decoded at the receiving end point. However, this convolution encoding results in a drop of the effective data rate, hence there is a trade-off to be considered. To address this trade-off, the convolution encoding is selectively applied in one approach. For example, the convolution encoding may be applied for packages transmitted over a degraded link, but data packages transmitted over normal links (which are not degraded) may be transmitted without convolution encoding.

Figure 4:
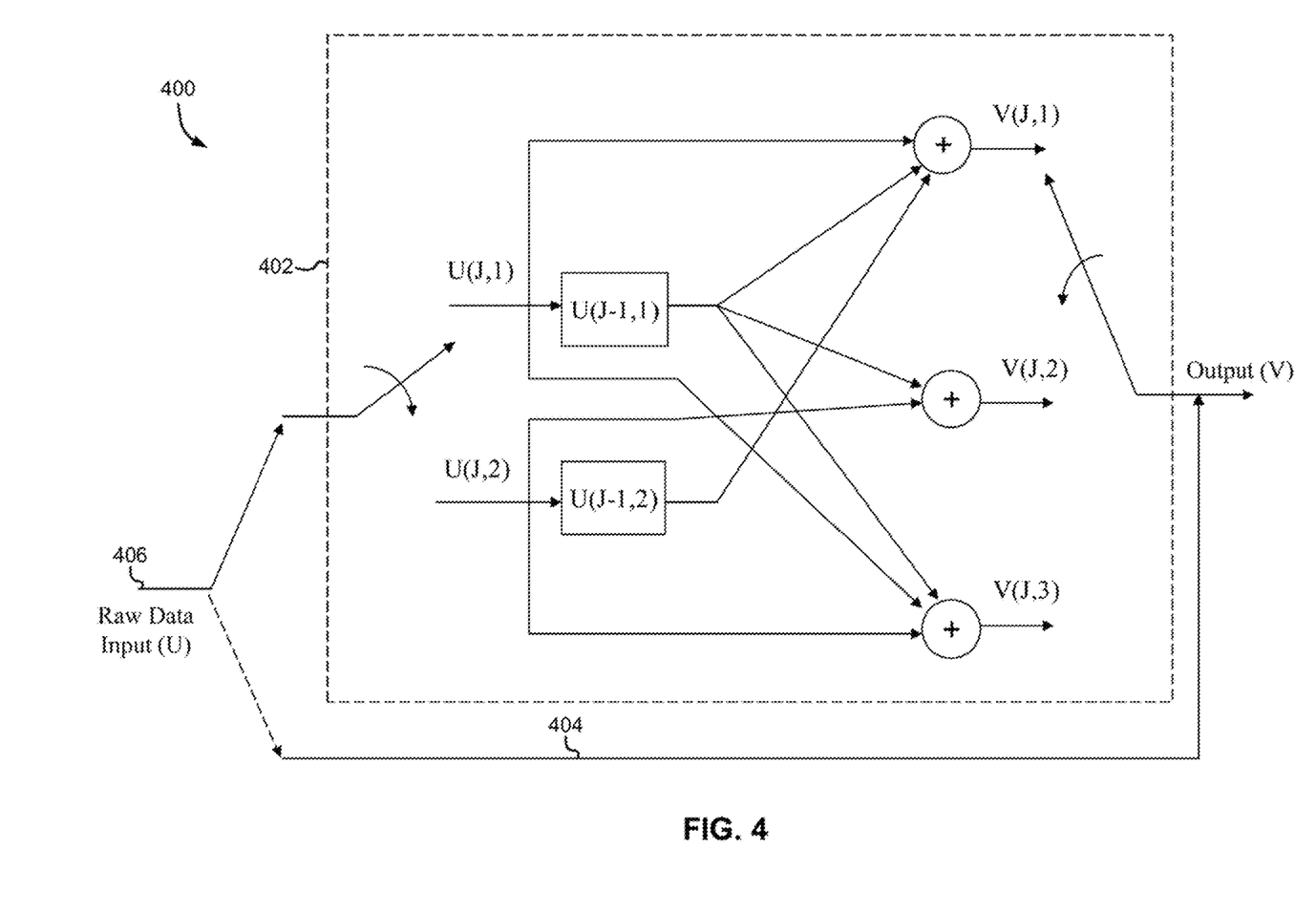
FIG. 4 is a simplified block diagram of a system, according to one embodiment.

Now referring to FIG. 4, a block diagram of a system 400 is shown. The system 400 includes a binary convolution encoder 402, which may be used for robust error correction when transmitting data across degraded links, and a bypass 404. In this exemplary convolution encoder 402, there are three outputs (n=3), two inputs (k=2), and one stage of delay (m=1). Of course, other convolution encoders may be used, as would be understood by one of skill in the art upon reading the present descriptions.

The convolution encoder 402 is configured to receive a raw data input 406. However, in some approaches, this raw data input 406 may bypass 404 the convolution encoder 402, due to some determination that the convolution encoding is not necessary or beneficial to the raw data input 406. For example, this bypass 404 may be utilized when the raw data input 406 is destined for a normal link, as opposed to a degraded link (which would predicate the use of the convolution encoder 402 on the raw data input 406). Of course, other factors may be used in determining whether or not to use the convolution encoder 402, as will be described in more detail later or as would be known to one of skill in the art.

The (3,2,1) convolution encoder 402 takes two bits of raw data and encodes it into three bits of data, thus creating 50% overhead. The code rate of this encoding is 2/3, meaning that 2 bits of raw data are encoded into 3 bits. This overhead affects how much data is transmitted across the degraded link, as a (3,2,1) convolution encoder 402 is forced to transmit 50% more data than would be required for simply transmitting the data without encoding. Hence, there is a trade-off, as the error correction process generates overhead which reduces the effective data rate. However, the use of the convolution encoder 402 on the data results in reducing an amount of time that is consuming in retrying to send data when an error is encountered in the initial transmission.

In this system 400, sometimes error correction applied by the convolution encoder 402 is valuable to insure that data is transmitted across degraded links properly, and other times error correction applied by the convolution encoder 402 (and its associated overhead) is unnecessary because the link is normal (fully functional) and retries are rare and thus do not negatively affect performance.

In one embodiment, link degradation may be measured by a number of retries necessary to successfully transmit data thereacross. In other approaches, degradation of a link may be measured based on a number of soft errors encountered on the receiving end of the link, hard errors, or any other suitable indication of transmission problems in the link.

Figure 5:
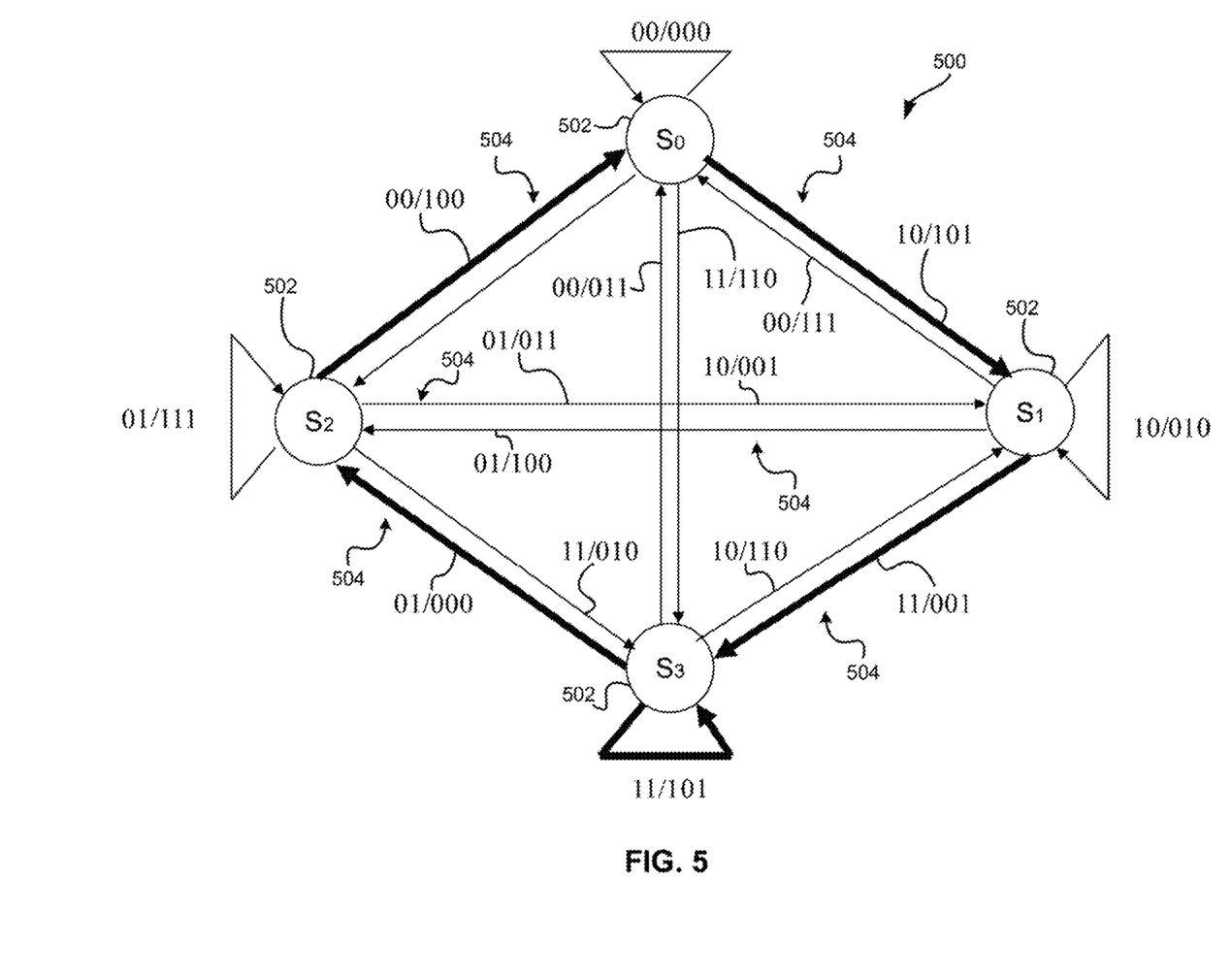
FIG. 5 is an encoder state diagram for a (3,2,1) binary convolution encoder, according to one embodiment.

Now referring to FIG. 5, an encoder state diagram 500 is shown according to one embodiment. There are four states 502 in the encoder state diagram 500, with the number of states 502 being equal to $2^{km}=2^2=4$. In addition, there are four branches 504 entering each state 502, with the number of branches 504 per state 502 equal to $2^k=2^2=4$. Also, there are four branches 504 leaving each state 502, with the number of branches 504 per state 502 being equal to $2^k=2^2\times 4$.

As an illustrative example, for a (3,2,1) binary convolution encoder 402 as shown according to one embodiment in FIG. 4, as shown in FIG. 5, the encoder state diagram 500 is configured to encode 1011110100 into 101001101000100 by this flow:

(1) State $S_0$ to state $S_1$ encodes 10 as 101,
(2) state $S_1$ to state $S_3$ encodes 11 as 001,
(3) state $S_3$ to state $S_3$ encodes 11 as 101,
(4) state $S_3$ to state $S_2$ encodes 01 as 000, and
(5) state $S_2$ to state $S_0$ encodes 00 as 100, resulting in 1011110100 being encoded into 101001101000100.

Figure 6:
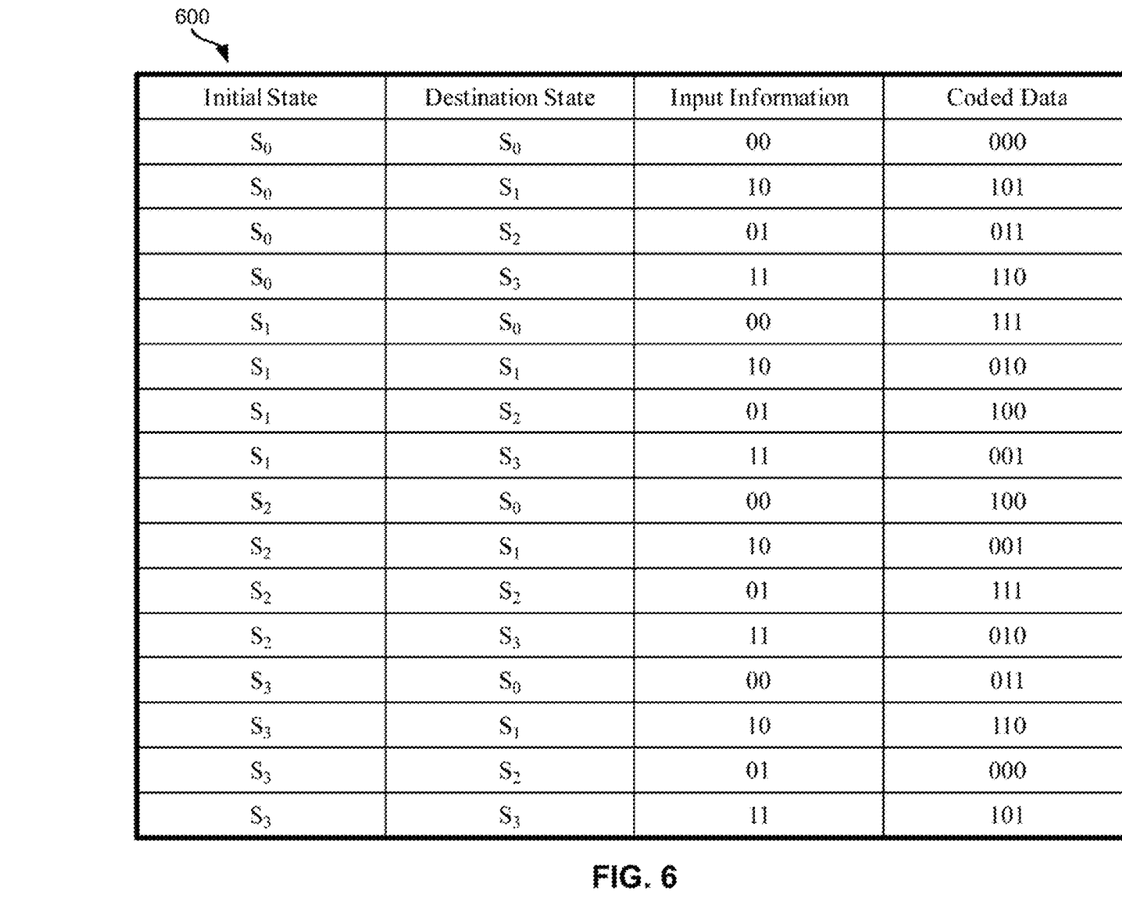
FIG. 6 shows an encoder state diagram for a (3,2,1) binary convolution encoder in table form, according to one embodiment.

FIG. 6 shows an encoder state diagram for a (3,2,1) binary convolution encoder in table form, e.g., the table 600 is a tabular representation of the encoder state diagram 500 shown in FIG. 5. Referring again to table 600 in FIG. 6, the first column indicates an initial state, the second column indicates a destination state, the third column indicates the data input for this encoding, and the fourth column indicates the encoded data. Therefore, a table 600 as shown in FIG. 6, a decision tree similar to the Encoder State Diagram 500 as shown in FIG. 5, or any other suitable encoding system, method, and/or logic may be used to encode raw data into encoded data on the sending end of the degraded link.

In one such embodiment, an XOR function may be utilized on the receiving end of the degraded link, as shown in table 1 below, according to one exemplary embodiment for decoding the (3,2,1) binary convolution encoding on raw data. The XOR (exclusive or) function is shown below according to one embodiment.

TABLE 1

| XOR Function |
|---|
| XOR Function |
| 0 XOR 0 = 0 |
| 0 XOR 1 = 1 |

TABLE 1-continued

XOR Function
XOR Function

1 XOR 0 = 1
1 XOR 1 = 0

Figure 7:
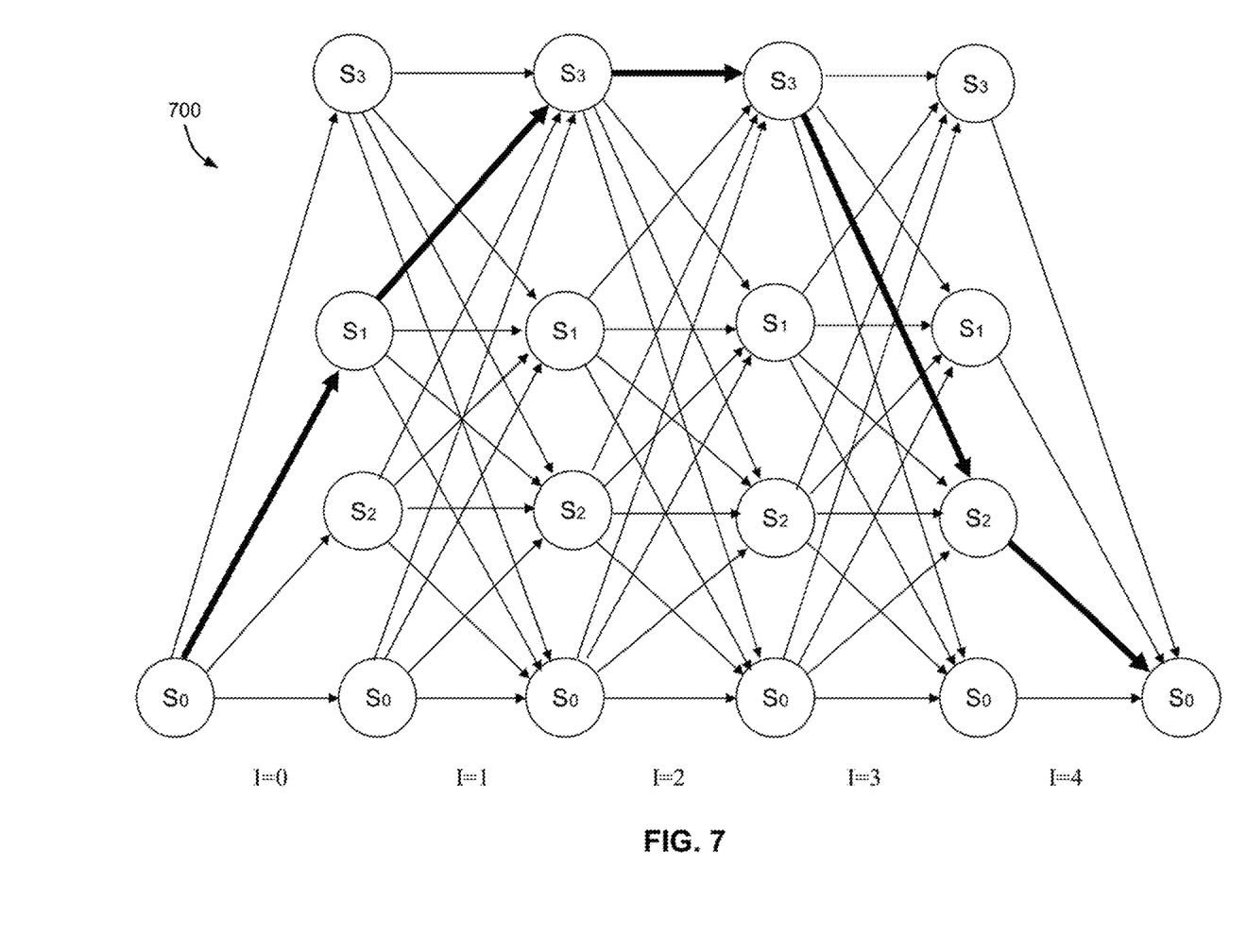
FIG. 7 is a trellis diagram for a (3,2,1) binary convolution encoder, according to one embodiment.

Now referring to FIG. 7, a trellis diagram 700 is shown, according to one exemplary embodiment, for the (3,2,1) binary convolution encoder. Using this trellis diagram 700, the raw data is recovered even when a significant number of random bits are missing, by use of the XOR operator shown in Table 1 to find a path with a zero Hamming distance. For example, using the trellis diagram 700 and the XOR function shown in Table 1, 101001101000100 is decoded into raw data 1011110100 by this process:

(1) (I=0) state $S_0$ to state $S_1$ decodes 101 as 10,
(2) (I=1) state $S_1$ to state $S_3$ decodes 001 as 11,
(3) (I=2) state $S_3$ to state $S_3$ decodes 101 as 11,
(4) (I=3) state $S_3$ to state $S_2$ decodes 000 as 01, and
(5) (I=4) state $S_2$ to state $S_0$ decodes 100 as 00, resulting in 101001101000100 being decoded into 1011110100.

Therefore, a table 600 as shown in FIG. 6, a trellis diagram 700 as shown in FIG. 7, or any other suitable decoding system, method, and/or logic may be used to decode encoded data into raw data on the receiving end of the degraded link. Of course, any other encoding/decoding system, method, and/or logic may be used instead of the specific embodiments described herein, such as 9/8.

Figure 8A:
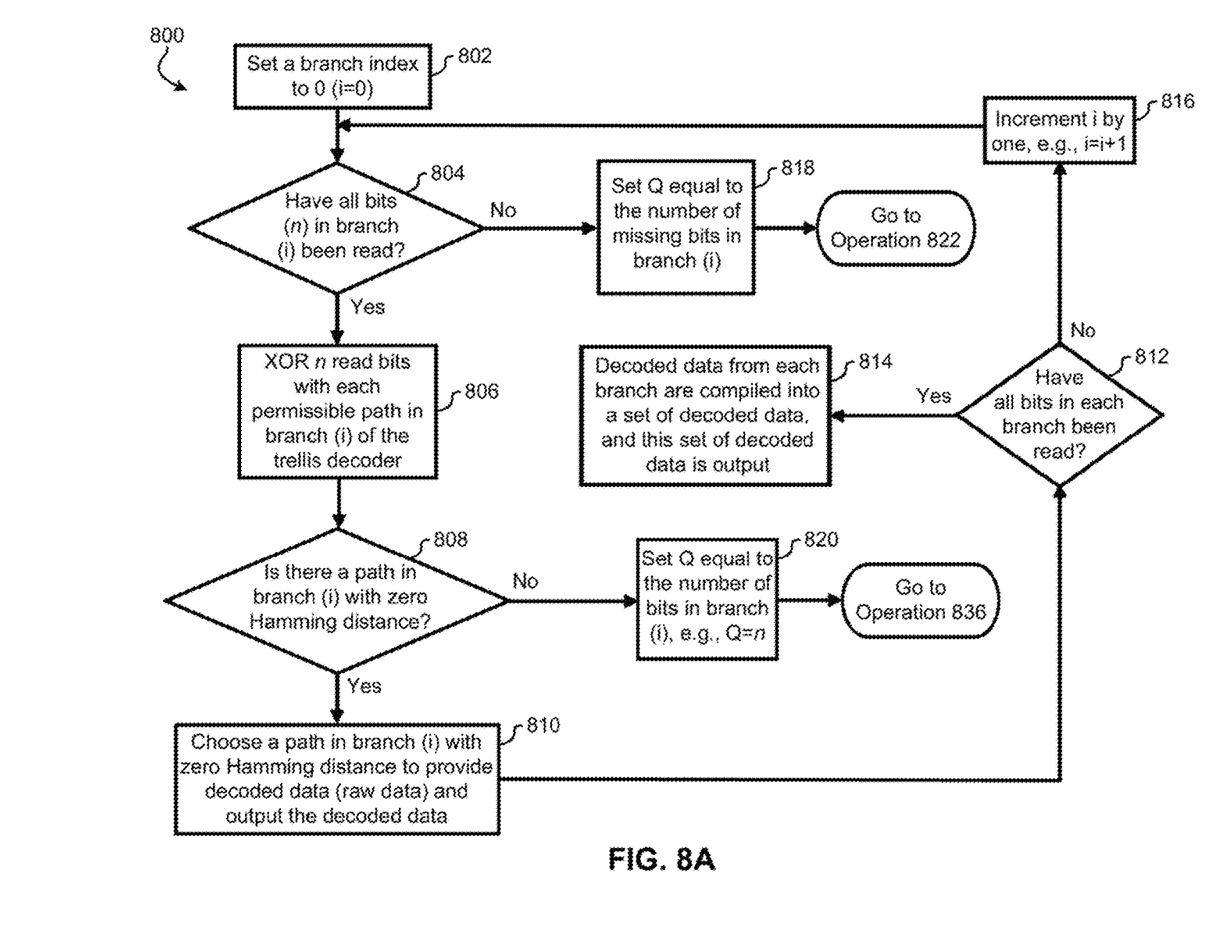
FIGS. 8A-8B show flowcharts of a process according to one embodiment.
Figure 8B:
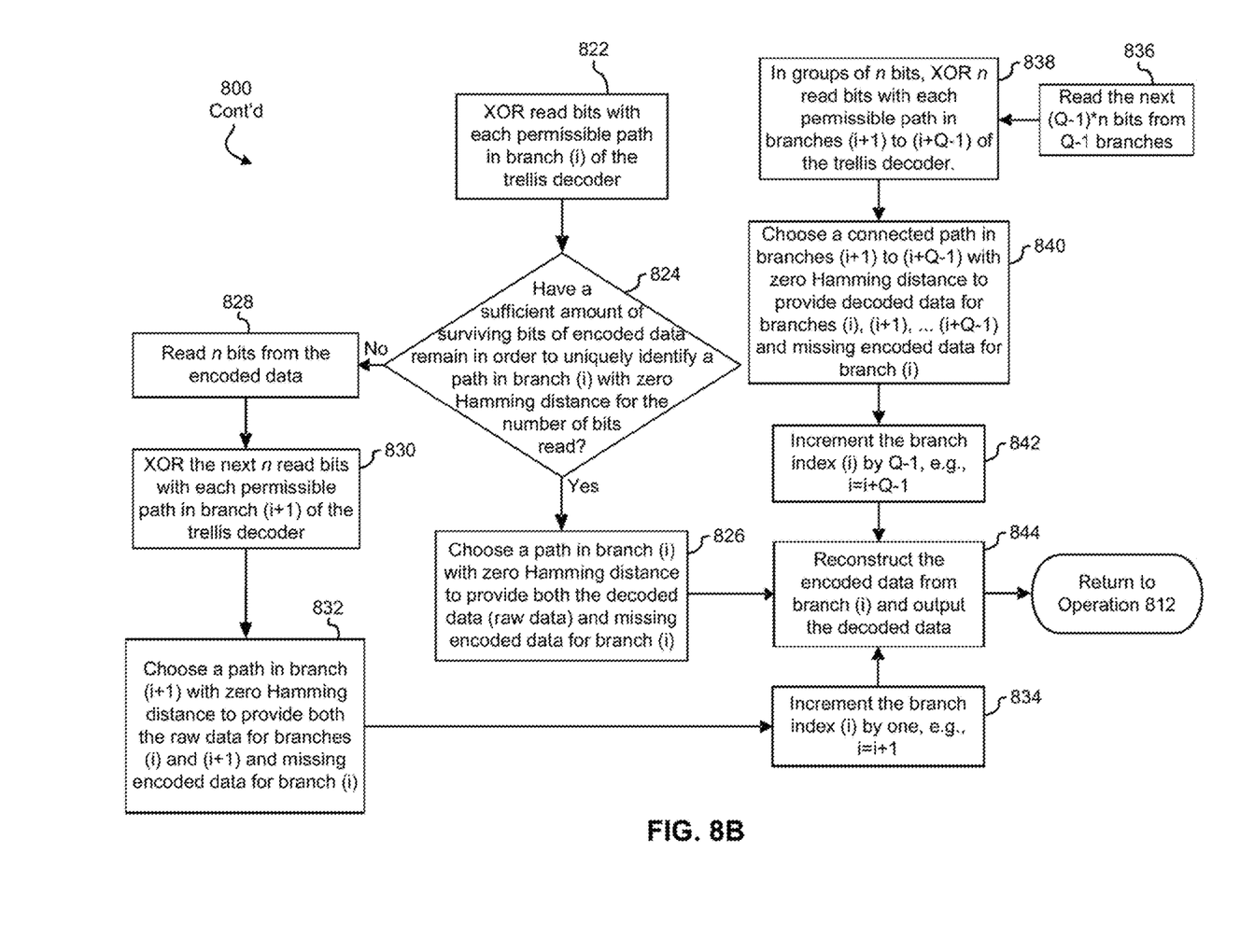

FIGS. 8A-8B show a flowchart which describes a trellis decoding process 800, using an XOR function, to search for a path with a zero Hamming distance, according to one embodiment. This trellis decoding process 800 may be used in conjunction with any of the techniques described in FIGS. 5-7 and Table 1, among others, according to various embodiments. Referring again to the trellis decoding process 800 shown in FIGS. 8A-8B, Q is a number of missing bits in branch I, so that missing information may be reconstructed via the trellis decoder. In other words, a significant number of random bits may be missing, and the entire message may still be reconstructed, based on the zero Hamming distance criteria achieved by the use of the XOR function, thus overcoming the handicap and problems associated with the use of a degraded link.

The trellis decoding process 800 may be performed in accordance with the present invention in any of the environments depicted in FIGS. 1-7, among others, in various embodiments. Of course, more or less operations than those specifically described in FIGS. 8A-8B may be included in the trellis decoding process 800, as would be understood by one of skill in the art upon reading the present descriptions.

Each of the steps of the trellis decoding process 800 may be performed by any suitable component of the operating environment. For example, in one embodiment, the trellis decoding process 800 may be partially or entirely performed by a switch (virtual or physical), a router (virtual or physical), a server (virtual or physical), an end device, a storage controller, a management controller, a processor (such as an ASIC, a FPGA, a CPU, etc.) embodied in a computer or device, a host or server connected to an internal or external network, etc.

With reference to FIG. 8B, in operation 802, a branch index (indicator which tracks which branch is currently being evaluated) is set to zero. This is an initialization step, and is not repeated until and unless the trellis decoding process 800 is repeated.

In operation 804, it is attempted to read all bits in branch (i)—assuming n bits in branch (i). During this operation, a number of bits may be unreadable. When all n bits are read, process 800 continues to operation 806; otherwise, when one or more bits are unreadable, process 800 continues to operation 818.

In operation 806, an XOR function is applied to all n, bits with each permissible path in branch (i) of a trellis decoder.

In operation 808, it is determined whether a path in branch (i) with zero Hamming distance is found. When this path is found, process 800 continues to operation 810; otherwise, process 800 returns to operation 820.

In operation 810, a path in branch (i) is chosen that has zero Hamming distance to provide decoded data (raw data that was encoded) from branch (i) and the decoded data from branch (i) is stored to a memory.

In operation 812, it is determined whether all bits in each branch have been read. When all branches have been read, process 800 continues to operation 814; otherwise, process 800 continues to operation 816.

In operation 814, decoded data from each branch are compiled into a set of decoded data, and this set of decoded data (the raw data that was encoded originally) is output, such as storing to memory, sending to another system, displaying, etc.

In operation 816, the branch index (i) is incremented by one (i=i+1), and the process 800 returns to operation 804.

In operation 818, an indicator (Q) which represents a number of missing bits in branch (i) is set to the number of missing bits in branch (i), e.g., Q is set to n minus the number of bits read correctly. Then, process 800 continues to operation 822 shown in FIG. 8B.

In operation 820, an indicator (Q) which represents a number of missing bits in branch (i) is set to the number bits in branch (i), e.g., Q is set to n. Then, process 800 continues to operation 836 shown in FIG. 8B.

With reference to FIG. 8B, in operation 822, the bits in branch (i) are XOR read with each permissible path in branch (i) of the trellis decoder.

In operation 824, it is determined whether a sufficient amount of surviving bits of encoded data remain in order to uniquely identify a path in branch (i) with zero Hamming distance for the number of bits read. When a sufficient amount of surviving bits of encoded data remain, process 800 continues to operation 826; otherwise, when there are not a sufficient amount of surviving bits, process 800 continues to operation 828.

In operation 826, a path in branch (i) is chosen with zero Hamming distance to provide both the raw data and the missing encoded data for branch (i). Then, process 800 continues to operation 844.

In operation 828, n bits from the coded data are read.

In operation 830, the next n read bits have an XOR function applied thereto with each permissible path in branch (i+1) of the trellis decoder.

In operation 832, a path in branch (i+1) with zero Hamming distance is chosen to provide both the raw data for branches (i) and (i+1) and missing encoded data for branch (i).

In operation 834, the branch index (i) is incremented by one (i=i+1).

In operation 836, the next (Q−1)*n bits are read from Q−1 branches.

After operation 836, operation 838 follows, where groups of n read bits have an XOR function applied thereto with each permissible path in branches (i+1) to (i+Q−1) of the trellis decoder.

In operation 840, a connected path in branches (i+1) to (i+Q−1) is chosen with zero Hamming distance to provide both the raw data for branches (i), (i+1), . . . , (i+Q−1), and missing encoded data for branch (i).

In operation 842, the branch index (i) is incremented by Q−1 (i=i+Q−1).

In operation 844, the encoded data is reconstructed from the branch (i) and this decoded data from branch (i) is output, and the process 800 returns to operation 812 as shown in FIG. 8A.

At 32 Gigabytes per second (Gbps) raw data throughput, and with a code rate of 2/3 (2 bits input results in 3 bits output, e.g., a (3,2,1) encoder), the actual data rate is about 20 Gbps when the link is degraded. However, using this technique, retries are mitigated by the robust error correction of the convolution encoder/trellis decoder and the link continues to be operational (as opposed to a degraded link where a sending end may retry data without ever successfully transmitting it across the degraded link). Thus, in combination, the robustness of convolution-trellis encoding/decoding (ENDEC) may be provided when the link is degraded, while data may be transmitted across normal links without the added overhead of convolution-trellis ENDEC when the link is healthy.

Figure 9:
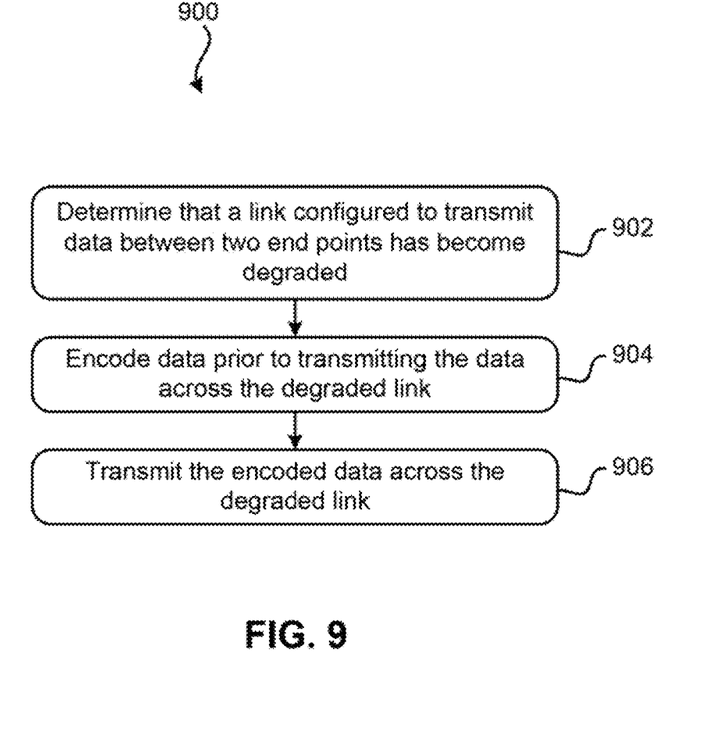
FIG. 9 shows a flowchart of a method according to one embodiment.

Now referring to FIG. 9, a flowchart of a method 900 for providing early warning of storage device failure is shown, according to one embodiment. The method 900 may be performed in accordance with the present invention in any of the environments depicted in FIGS. 1-8B, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in one embodiment, the method 900 may be partially or entirely performed by a switch (virtual or physical), a router (virtual or physical), a server (virtual or physical), an end device, a storage controller, a management controller, a processor (such as an ASIC, a FPGA, a CPU, etc.) embodied in a computer or device, a host or server connected to an internal or external network, etc.

As shown in FIG. 9, method 900 may initiate with operation 902, where it is determined that a link configured to transmit data between two end points has become degraded. The end points may be any system, device, apparatus, etc., physical or virtual, that is configured to send and/or receive data across one or more physical links. The link may be any physical connection between the two end points, such as an Ethernet link, FCoE link, FC link, etc.

In one further embodiment, method 900 may further comprise determining that the link is normal by: counting a number of retries over the link during a period of time, comparing the number of retries against a threshold, and reporting the link as normal when the number of retries does not exceed the threshold. Furthermore, the data may be transmitted across the normal link without encoding the data.

In one embodiment, the link may be determined to have become degraded when the number of retries exceeds the threshold. Furthermore, more than one threshold may be used, with more robust (higher error code rate) encoding being selected to account for the increasingly error-prone link as each higher threshold is exceeded.

In operation 904, data is encoded prior to transmitting the data across the degraded link. Any form of encoding may be used, such as ECC, PRML, and others known in the art. The robustness of any of the specific encoding schemes may also be adjusted to account for conditions in the link, such that the robustness of the encoding does not introduce so much overhead that the benefits of using the encoding are outweighed by negative impact on the performance of the link (e.g., effective data rate).

For example, depending on the number of retries encountered on a degraded link, an encoding scheme with a higher or lower code rate may be used. For example, a 2/3 PRML may be used when the number of retires is very high, e.g., greater than 50% of the data packets must be resent. However, a lower error code rate PRML, such as 8/9, 16/17, 24/25, etc., may be used when the number of retires is less.

This concept may also be used in selecting any other error encoding scheme known in the art, such that the amount of error correction provided (and the associated overhead thereof) does not negatively impact the effective data rate across the degraded link more than the number of retires being experienced on the degraded link.

In one approach, the encoding the data prior to transmitting the data across the degraded link may comprise: segmenting the data into k-bit segments, wherein k is greater than or equal to 1, and convolution encoding the k-bit segments using m stages of delay, wherein m is greater than or equal to one.

In another further embodiment, each k-bit segment of the data may be marked with a marker indicating convolution encoding. The convolution encoding the k-bit segments using m stages of delay may comprise generating $2^{km}$ states with $2^k$ branches entering each state and $2^k$ branches leaving each state.

In operation 906, the encoded data is transmitted across the degraded link. The encoding may prevent numerous retries from being necessary to successfully transmit the data across the link.

In another embodiment, the encoded data may be received, e.g., at the receiving end point, and the encoded data may be decoded to retrieve the data (e.g., the raw data).

In a further approach, the method 900 may further include receiving the convolution encoded data and applying an XOR function to the convolution encoded data with pathing allowed by the convolution encoding to retrieve error-corrected data, and identifying the error-corrected data as an overall path with zero Hamming distance.

Furthermore, method 900 may also include monitoring the degraded link over one or more predetermined periods of time, determining that the degraded link is normal; and sending subsequently received data across the normal link without encoding the subsequently received data. The link may be determined to be normal or less error-prone as discussed previously or according to any method or technique known in the art. The predetermined period of time may be any suitable period of time, such as a fraction of a second, one second, 10 seconds, one minute, 10 minutes, etc. The period of time may be based on some other factor, such as how frequently links have historically degraded, how frequently links have become normal after being declared to be degraded, traffic flow changes, packet size, link throughput, etc.

In another embodiment, encoding may only be utilized when the link is degraded and the overhead necessary to provide the encoding has less of a negative impact on performance of the link (e.g. the effective data rate) than would the observed number of retries. For example, if the overhead is 50%, and the number of retries only requires every tenth packet to be retried, then the impact on performance due to the overhead outweighs the impact due to retires. In this case, encoding would not be used since the effective data rate is greater when no encoding is used and occasional retries are required.

Method 900 may be performed by a system, apparatus, computer program product, or in any other way known in the art. In one such embodiment, a system (such as a switch controller, switch, server, networking system, computer, storage controller, etc.) may include a processor (such as a microprocessor, CPU, ASIC, FPGA, etc.) and modules, code, and/or logic (soft or hard) integrated with and/or executable by the processor to execute the steps of the method 900 or portions thereof. In another embodiment, a computer program product may include a computer readable storage medium having program code embodied therewith, the program code readable/executable by a processor to execute the method 900 or portions thereof.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising a processor and logic integrated with and/or executable by the processor, the logic being configured to cause the processor to:
   determine that a link configured to transmit data between two end points in a networking system has become degraded;
   encode data prior to transmitting the data across the degraded link, the logic configured to encode the data being configured to:
      segment the data to be encoded into k-bit segments;
      mark each k-bit segment of the data to be encoded with a marker indicating convolution encoding; and
      convolution encode the k-bit segments using m stages of delay via a partial response maximum likelihood (PRML) encoding scheme to produce encoded data, wherein k is greater than or equal to 1 and m is greater than or equal to 1,
      wherein a 2/3 PRML is used to convolution encode the data in response to a determination that greater than 50% of data packets from the data are resent over the link, and
      wherein a lower error code rate PRML is used to convolution encode the data in response to a determination that 50% or less of the data packets from the data are resent over the link; and
   transmit the encoded data across the degraded link provided that data transmitted across a normal link is not encoded.

2. The system as recited in claim 1, wherein the logic is further configured to cause the processor to determine that the link is normal by:
   counting a number of retries over the link during a period of time;
   comparing the number of retries against a threshold; and
   reporting the link as normal when the number of retries does not exceed the threshold.

3. The system as recited in claim 1, wherein the processor determines that the link has become degraded by:
   counting a number of retries over the link during a period of time;
   comparing the number of retries against a threshold; and
   reporting the link as degraded when the number of retires exceeds the threshold.

4. The system as recited in claim 1, wherein the logic is further configured to cause the processor to:
   receive the encoded data;
   apply an XOR function to the encoded data with pathing allowed by the convolution encoding to retrieve error-corrected data; and
   identify the error-corrected data as an overall path with zero Hamming distance.

5. The system as recited in claim 1, wherein the logic configured to convolution encode the k-bit segments using the m stages of delay is configured to generate $2^{km}$ states with $2^k$ branches entering each state and $2^k$ branches leaving each state.

6. The system as recited in claim 1, wherein the logic is further configured to cause the processor to:
   monitor the degraded link over one or more predetermined periods of time;
   determine that the degraded link is normal; and
   send subsequently received data across the normal link without encoding the subsequently received data.

7. A computer program product for selectively overcoming a degraded link in a networking system, the computer program product comprising a non-transitory computer readable storage medium having program code embodied therewith, the embodied program code being readable/executable by a processor to cause the processor to:
   determine, by the processor, that a link configured to transmit data between two end points has become degraded;
   encode, by the processor, data prior to transmitting the data across the degraded link, the embodied program code further causing the processor to:
      segment the data to be encoded into k-bit segments;
      mark each k-bit segment of the data to be encoded with a marker indicating convolution encoding; and
      convolution encode the k-bit segments using m stages of delay via a partial response maximum likelihood (PRML) encoding scheme to produce encoded data, wherein k is greater than or equal to 1 and m is greater than or equal to 1,
      wherein a 2/3 PRML is used to convolution encode the data in response to a determination that greater than 50% of data packets from the data are resent over the link, and
      wherein a lower error code rate PRML is used to convolution encode the data in response to a determination that 50% or less of the data packets from the data are resent over the link; and
   transmit, by the processor, the encoded data across the degraded link provided that data transmitted across a normal link is not encoded.

8. The computer program product as recited in claim 7, wherein the program code is further readable/executable by the processor to:
   determine that the link is normal by:
      counting a number of retries over the link during a period of time,
      comparing the number of retries against a threshold, and
      reporting the link as normal when the number of retries does not exceed the threshold; and
   transmit the data across the normal link without encoding the data,
   wherein the processor determines that the link has become degraded when the number of retires exceeds the threshold.

9. The computer program product as recited in claim 7, wherein the program code is further readable/executable by the processor to:
  monitor the degraded link over one or more predetermined periods of time;
  determine that the degraded link is normal and no longer degraded; and
  send subsequently received data across the normal link without encoding the subsequently received data.

10. A method for selectively overcoming a degraded link in a networking system, the method comprising:
  determining that a link configured to transmit data between two end points has become degraded;
  encoding data prior to transmitting the data across the degraded link, the encoding the data comprising:
    segmenting the data to be encoded into k-bit segments;
    marking each k-bit segment of the data to be encoded with a marker indicating convolution encoding; and
    convolution encoding the k-bit segments using m stages of delay via a partial response maximum likelihood (PRML) encoding scheme to produce encoded data, wherein k is greater than or equal to 1 and m is greater than or equal to 1,
    wherein a 2/3 PRML is used to convolution encode the data in response to a determination that greater than 50% of data packets from the data are resent over the link, and
    wherein a lower error code rate PRML is used to convolution encode the data in response to a determination that 50% or less of the data packets from the data are resent over the link; and
  transmitting the encoded data across the degraded link.

11. The method as recited in claim 10, further comprising:
  determining that the link is normal by:
    counting a number of retries over the link during a period of time;
    comparing the number of retries against a threshold; and
    reporting the link as normal when the number of retries does not exceed the threshold; and
  transmitting the data across the normal link without encoding the data,
  wherein the link is determined to have become degraded when the number of retries exceeds the threshold.

12. The method as recited in claim 10, further comprising:
  receiving the encoded data; and
  decoding the encoded data to retrieve the data.

13. The method as recited in claim 10, further comprising:
  receiving the encoded data; and
  applying an XOR function to the encoded data with pathing allowed by the convolution encoding to retrieve error-corrected data; and
  identifying the error-corrected data as an overall path with zero Hamming distance.

14. The method as recited in claim 10, wherein the convolution encoding the k-bit segments using m stages of delay comprises generating $2^{km}$ states with $2^k$ branches entering each state and $2^k$ branches leaving each state.

15. The method as recited in claim 10, further comprising:
  monitoring the degraded link over one or more predetermined periods of time;
  determining that the degraded link is normal; and
  sending subsequently received data across the normal link without encoding the subsequently received data.

* * * * *